United States Patent [19]
Urushibata

[11] Patent Number: 5,393,007
[45] Date of Patent: Feb. 28, 1995

[54] CORD REEL MECHANISM

[75] Inventor: Kenichi Urushibata, Tochigi, Japan

[73] Assignees: Sumitomo Electric Industries, Ltd.; Matsushita Electric Industrial Co., Ltd., Osaka, Japan

[21] Appl. No.: 33,761

[22] Filed: Mar. 18, 1993

[30] Foreign Application Priority Data

Mar. 19, 1992 [JP] Japan ............... 4-014862[U]
Jun. 8, 1992 [JP] Japan ............... 4-038659[U]

[51] Int. Cl.6 ............................................ H01R 35/02
[52] U.S. Cl. ................................... 242/532; 439/15; 439/164
[58] Field of Search ............... 242/54, 85; 439/13, 439/15, 163, 164; 191/12 R, 12.2 R, 12.2 A, 12.4

[56] References Cited

U.S. PATENT DOCUMENTS

| | | | |
|---|---|---|---|
| 4,744,763 | 5/1988 | Suzuki et al. | 439/15 |
| 4,838,803 | 6/1989 | Kondo | 439/164 |
| 4,844,359 | 7/1989 | Kato | 242/54 R |
| 4,923,135 | 5/1990 | Schabmüller | 242/54 R |
| 4,925,122 | 5/1990 | Bannai | 242/54 R X |
| 4,928,901 | 5/1990 | Bannai et al. | 242/54 R X |
| 4,930,716 | 6/1990 | Bannai | 242/85 |
| 4,975,063 | 12/1990 | Ida et al. | 439/15 |
| 5,242,309 | 9/1993 | Hasegawa | 439/15 |

FOREIGN PATENT DOCUMENTS

| | | |
|---|---|---|
| 0387585 | 9/1990 | European Pat. Off. . |
| 3931905 | 6/1990 | Germany . |
| 59-149276 | 8/1984 | Japan ............... 242/54 R |

*Primary Examiner*—Daniel P. Stodola
*Assistant Examiner*—John P. Darling
*Attorney, Agent, or Firm*—Cushman Darby & Cushman

[57] ABSTRACT

A cord reel mechanism which includes a housing having inner and outer cylinders. A tape-like cord is vortically wound about the inner cylinder inside the housing. The inner and outer cylinder rotate relatively so as to tighten and loosen the cord. Reinforcing tape segments are attached to the tape-like cord at spaced locations to support the cord and prevent buckling. The reinforcing tape segments each have a tapered portion and an attachment portion.

21 Claims, 2 Drawing Sheets

CORD REEL MECHANISM

BACKGROUND OF THE INVENTION

The present invention relates to a mechanism for allowing the transmission of electrical signals between a rotating member and an adjacent stationary member. More specifically, the invention relates to a reel mechanism for a signal transmission cord attaching a rotary member such as a steering wheel column to an adjacent member such as a portion of an automobile frame.

The prior art in the field, see for example FIGS. 3 and 4, includes a reel mechanism having an inner cylinder 4 and an outer cylinder 7 which are both coaxially mounted on a rotating member. A signal transmission cord 6 is wrapped circumferentially around the inner cylinder 4 forming a number of layers of cord 6. The cord 6 is attached at one end to the inner cylinder 4 by a fastener 5 and is attached at the other end to a remote member. The outer cylinder 7 is hollow and covers the cord wrapped around the inner cylinder. When the rotary member is rotated, cord is circumferentially wound or unwound from the inner cylinder.

The problem with the prior art device described above is that when the cord is wound and unwound numerous times, the cord has a tendency to buckle 8 near its connection point with the inner cylinder 4. Buckling of the cord near the attachment point causes the cord to weaken and break, thus significantly shortening the useful life of the cord reel.

A currently practiced design for preventing buckling of the cord near its attachment point is a buckling prevention member 9 secured to the inner cylinder 4 to guide the cord 6 to assure a smooth form near the cylinder 4. The cord extends alongside the member 9 which is curved to a shape similar to that of the inner cylinder 4.

However, the above-mentioned prior art device does not solve the problem adequately, and is also more expensive to manufacture. Considerable time and effort are consumed attaching the buckling prevention member to the inner cylinder and arranging the cord to extend properly along the member. Also, the additional piece is expensive to manufacture and even when properly attached does not effectively prevent the cord from buckling.

The present invention addresses the problems mentioned above. It is an object of the invention to provide a cord reel device which prevents the cord from buckling and which does not require the time, effort and expense to assemble many parts, thus providing an inexpensive and durable cord reel mechanism.

SUMMARY OF THE INVENTION

The invention is a cord reel device having few parts which prevents buckling of the cord near the attachment point with the reel. To prevent buckling of the cord, a reinforcing tape is applied to the cord near the attachment point of the cord and the reel and at other spaced locations. The reinforcing tape provides stiffening support to the cord, so that the cord is compelled to retain a smooth flat or curved shape rather than buckle.

The reinforced cord is attached to an inner cylinder which is coaxially attached to a rotating member. The cord is wound circumferentially around the inner cylinder forming a number of layers. The inner cylinder and the surrounding wound cord are covered by a hollow outer cylinder which is also coaxial with the rotating member. When the rotating member is rotated, the cord is wound or unwound from the inner cylinder.

Other objects, features, and characteristics of the present invention as well as the methods of operation and functions of the related elements of structure, and the combination of parts and economics of manufacture, will become more apparent upon consideration of the following description and the appended claim with reference to the accompanying drawings, all of which form a part of this specification, wherever like reference numerals designate corresponding parts in the various figures.

DETAILED DESCRIPTION OF THE PREFERRED EMBODIMENT

Figure 2:
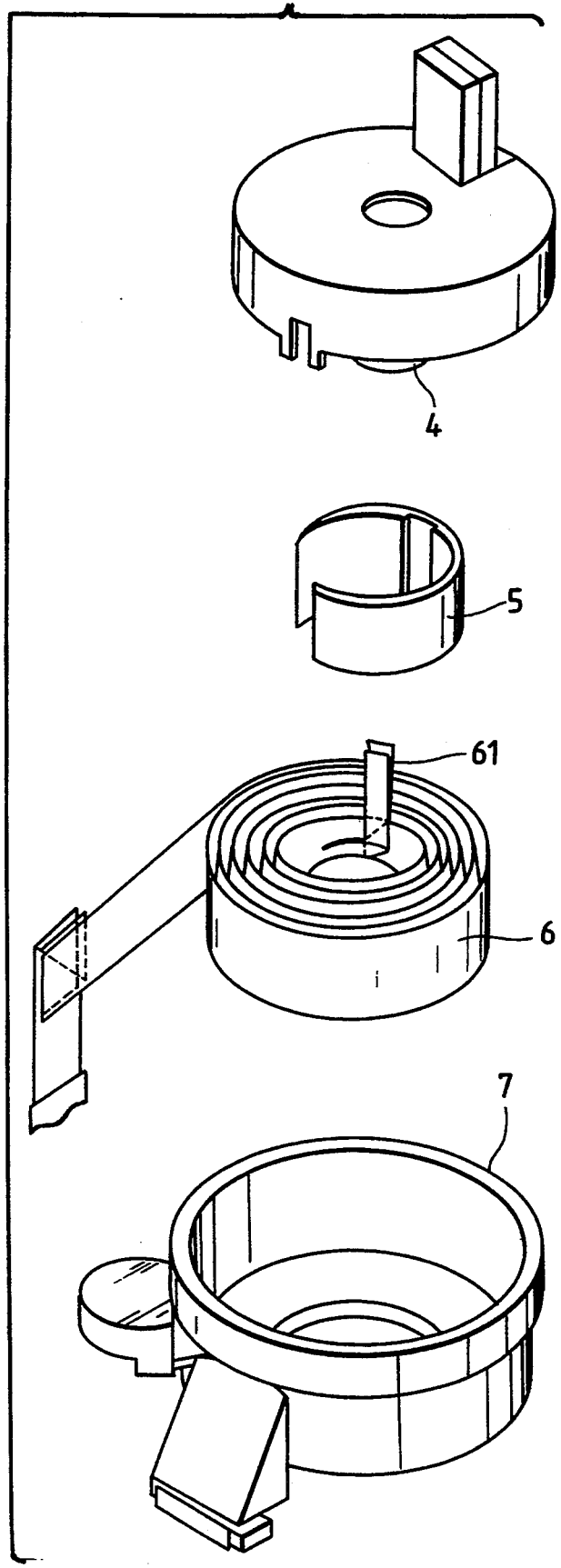
FIG. 2 is an exploded view of the cord reel mechanism of the present invention.

The cord reel mechanism of FIG. 2 includes a housing having an inner cylinder part 4 and an outer cylinder part 7. The housing cylinder parts have coaxial holes. The cord reel mechanism is attached to a rotating member which passes through the coaxial holes. A flattened transmission cord 6 has an inner cylinder connection end 61 which is attached to the inner cylinder by compression between a surface of the inner cylinder and by cord a fastener 5. The remainder of the cord is wrapped in coil fashion about a portion of the inner cylinder. The coiled tape-like cord and cord fastener are coaxial with the rotating member and are contained within the housing.

Figure 1A:
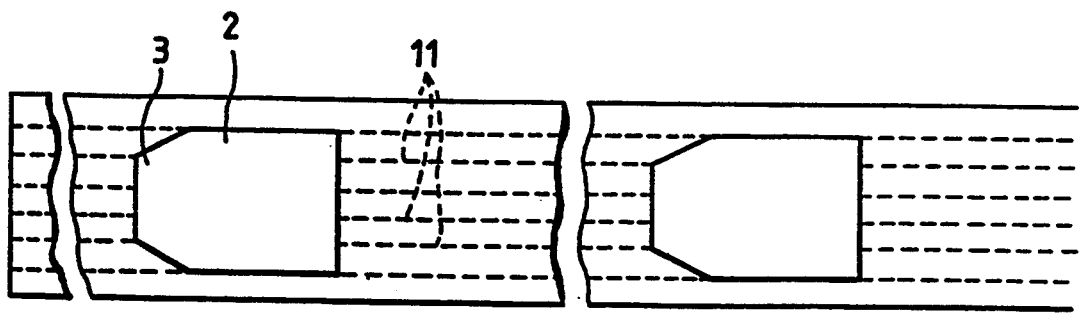
FIG. 1a is a top view of a portion of the transmission cord according to the present invention.
Figure 1B:
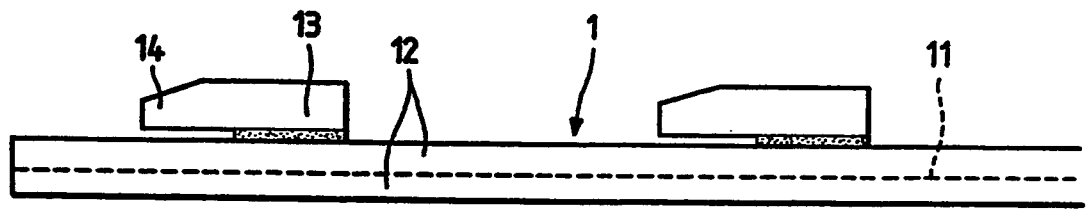
FIG. 1b is a side view of a portion of the transmission cord according to the present invention.

Referring to FIGS. 1a and 1b, a tape-like cord 1 is formed from two polyester films 12 each having a thickness of about 50$\mu$. Wires 11 having a thickness of about 0.15 mm and a width of about 1.5 mm are interposed between the polyester films. The polyester films are adhered together with a polyester adhesive to form the tape-like cord 6 of FIG. 2. The width of the tape-like cord depends upon the number of wires embedded therein.

Referring again to FIGS. 1a and 1b, a segment of reinforcing tape 2 is attached to portions of the tape-like cord 1 at intervals along the cord to prevent the cord from buckling. The reinforcing tape is applied at intervals of approximately 3 meters, beginning at the point of attachment of the tape-like cord to the inner cylinder. The intervals at which the tape is applied may be adjusted to account for the stiffness of the tape cord and the ultimate length of the cord.

The reinforcing tape 2 may be made of polyester for example, and has a maximum thickness of about 180$\mu$. Each segment of reinforcing tape has a length which depends upon the stiffness of the cord and tape and possibly other factors such as the overall length of the cord and the diameter of the inner cylinder about which the cord is wound. Preferably, the length of the segments of the reinforcing tape are about 100 mm.

The segments have a width which depends upon the width of the tape-like cord, and also upon the stiffness of the cord and the reinforcing tape.

Each segment has a tapered portion at one end, denoted in FIGS. 1a and 1b by numerals 3 and 14. At the tapered portion, the width of each segment of reinforcing tape gradually decreases 3 as shown in FIG. 1a. As an alternative to narrowing the width of the reinforcing tape at one end, the reinforcing tape may have a portion of gradually decreasing thickness 14 near the end of the tape as shown in FIG. 1b. Or, the segment may have both a narrowing width and decreasing thickness at the tapered portion.

Each segment of reinforcing tape may be fully attached to the tape-like cord along its entire length by an adhesive such as glue. Alternatively, and preferably, each segment is only partially attached to the cord. Exceptional performance of the reinforced tape-like cord has been achieved where only an end 13 of each reinforcing segment is adhered to the tape-like cord. Ideally, for a tape segment 100 mm in length, about 30 mm, of the end of the segment away from the tapered end, is attached to the cord. The size of the attached portion may be varied, depending upon the length of the segments, the stiffness of the segment and the stiffness of the cord.

Figure 1C:
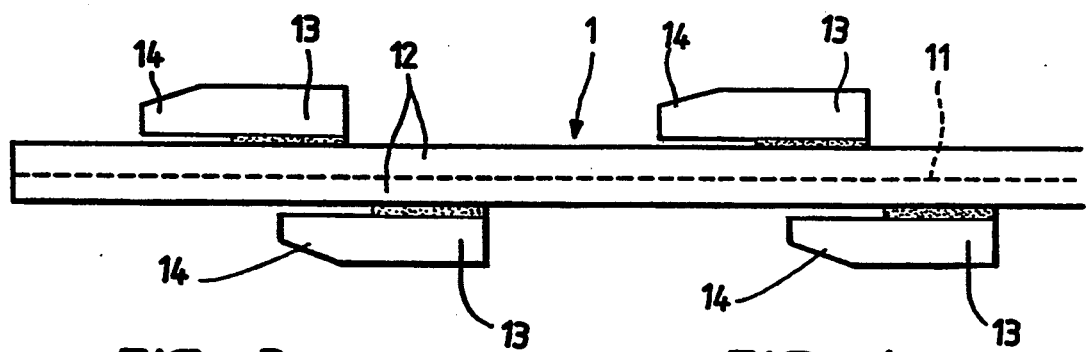
FIG. 1c is a side view of a portion of the transmission cord according to another embodiment of the present invention.
Figure 3:
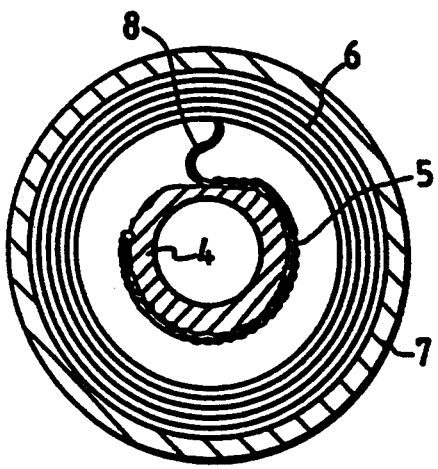
FIG. 3 is a cross-sectional view of a prior art cord reel mechanism.

The reinforcing tape may be applied to either side of the tape-like cord, or to both sides depending upon the stiffness and dimensions of the tape and the cord and the size of the cylinder, as seen in FIG. 1c, for example.

Figure 4:
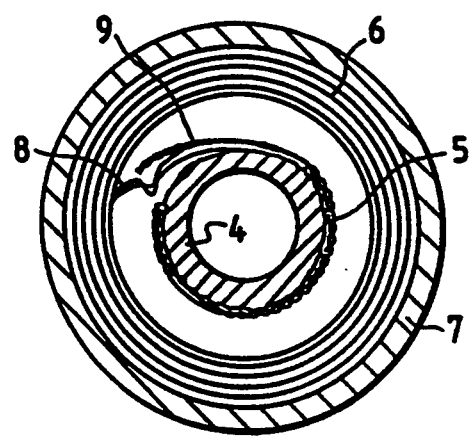
FIG. 4 is a cross-sectional view of another prior art cord reel mechanism.

During development of the present invention, the following test results were noted. A reel mechanism having a tape like cord but not having a reinforcing tape near the fastening point of the tape like cord to the inner cylinder was compared to a reel mechanism having a tape like cord as in the present invention. In the former apparatus, upon rotating the inner cylinder with a torque of 5 kgfcm so that the cord buckled as shown in FIG. 4, the cord failed after the cylinder was reciprocated only 103 times. However, when the apparatus of the present invention was tested under the same conditions, the cord did not buckle at the fastening point, and had not failed after more than five million reciprocations of the inner cylinder. The present invention thus provides a highly durable and efficient cord reel mechanism.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A cord reel mechanism comprising:
   a housing having an inner cylinder and an outer cylinder; and
   a flattened cord contained in the housing, the flattened cord being attached at one end to the inner cylinder and vortically wound about the inner cylinder, the flattened cord having a plurality of reinforcing tape segments attached at spaced apart locations along the cord.

2. A cord reel mechanism as in claim 1, wherein a first reinforcing tape segment is attached to the flattened cord adjacent where the flattened cord is attached to the inner cylinder.

3. A cord reel mechanism as in claim 1, wherein each reinforcing tape segment has a tapered portion at one end.

4. A cord reel mechanism as in claim 3, wherein a width of each reinforcing tape segment decreases at the tapered portion.

5. A cord reel mechanism as in claim 3, wherein a thickness of each reinforcing tape segment decreases at the tapered portion.

6. A cord reel mechanism as in claim 3, wherein the thickness and the width of each reinforcing tape segment decrease at the tapered portion.

7. A cord reel mechanism as in claim 3, wherein the plurality of reinforcing tape segments is attached to the flattened cord such that the tapered portion of each reinforcing tape segment is more distant from an attachment point of the flattened cord to the inner cylinder than another end of the reinforcing tape segment.

8. A cord reel mechanism as in claim 1, wherein each reinforcing tape segment has a maximum thickness of about 180μ.

9. A cord reel mechanism as in claim 1, wherein the reinforcing tape segments are made of polyester.

10. A cord reel mechanism as in claim 1, wherein the reinforcing tape segments are attached to a first side of the flattened cord.

11. A cord reel mechanism as in claim 1, wherein the reinforcing tape segments are attached to a first and a second side of the flattened cord.

12. A cord reel mechanism as in claim 1, wherein the reinforcing tape segments are attached to the flattened cord at intervals of about 3 m.

13. A cord reel mechanism as in claim 1, wherein each reinforcing tape segment has a length of about 100 mm.

14. A cord reel mechanism as in claim 13, wherein each reinforcing tape segment has a tapered portion at one end.

15. A cord reel mechanism as in claim 14, wherein each reinforcing tape segment is attached to the flattened cord along an entire length of the reinforcing tape segment.

16. A cord reel mechanism as in claim 14, wherein each reinforcing tape segment is partially adhered at one end thereof to the flattened cord.

17. A cord reel mechanism as in claim 16, wherein the adhered end of each reinforcing tape segment is opposite the tapered end portion of the reinforcing tape segment.

18. A cord reel mechanism as in claim 17, wherein the adhered end of the reinforcing tape has a length of about 30 mm.

19. A cord reel mechanism comprising:
    a housing having an inner cylinder and an outer cylinder;
    a flattened cord contained within the housing, the flattened cord being attached at one end to the inner cylinder and vortically wound about the inner cylinder; and
    at least one reinforcing tape segment being attached to the flattened cord, wherein:
    said at least one reinforcing tape segment being about 100 mm in length;
    said at least one reinforcing tape segment having a tapered end portion;

said at least one reinforcing tape segment having an attachment end portion opposite said tapered end portion, the attachment end portion being about 30 mm in length; and said at least one reinforcing tape segment being attached by the attachment end portion to the flattened cord.

20. A cord reel mechanism as in claim 19 having a plurality of reinforcing tape segment attached to the flattened cord at spaced intervals of about 3 m along the tape-like cord.

21. A cord reel mechanism comprising:

a housing having an inner cylinder and an outer cylinder; and a flattened cord contained in the housing, the flattened cord being attached at one end to the inner cylinder and vortically wound about the inner cylinder, the flattened cord having a plurality of reinforcing tape segments attached to the cord, wherein each reinforcing tape segment has a tapered portion at one end thereof.

* * * * *